4 Sheets--Sheet 1.

H. A. HOUSE.
Machines for Bundling Kindling-Wood and other Substances.

No. 138,027.      Patented April 22, 1873.

Witnesses      Inventor

AM. PHOTO-LITHOGRAPHIC CO. N.Y. (OSBORNE'S PROCESS.)

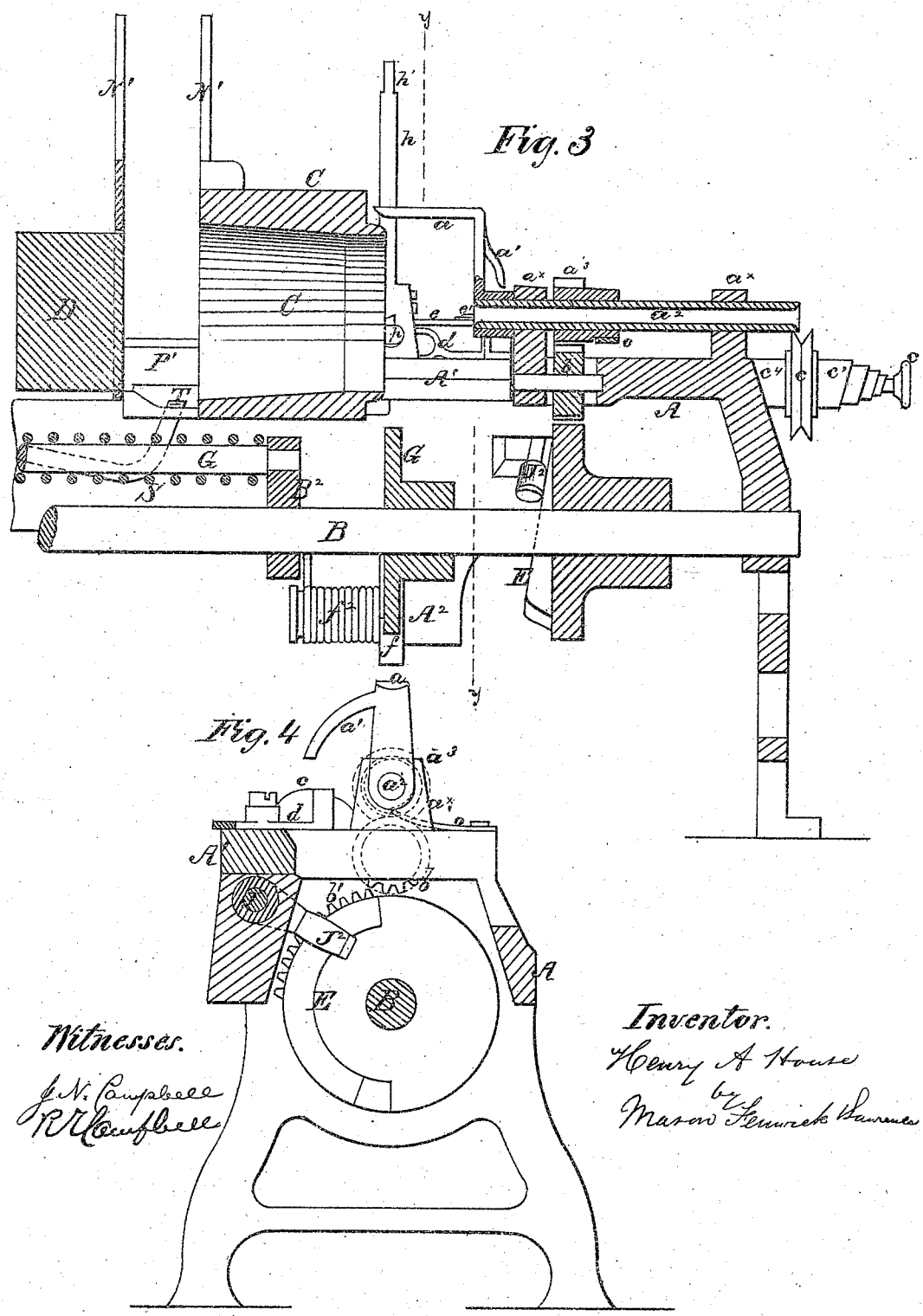
H. A. HOUSE.
Machines for Bundling Kindling-Wood and other Substances.
No. 138,027.  Patented April 22, 1873.

4 Sheets--Sheet 3.

H. A. HOUSE.
Machines for Bundling Kindling-Wood and other Substances.

No. 138,027. Patented April 22, 1873.

Witnesses.
J. N. Campbell
R. V. Campbell

Inventor:
Henry A. House
by
Marin Fenwick Lawrence

H. A. HOUSE.
Machines for Bundling Kindling-Wood and other Substances.
No. 138,027. Patented April 22, 1873.
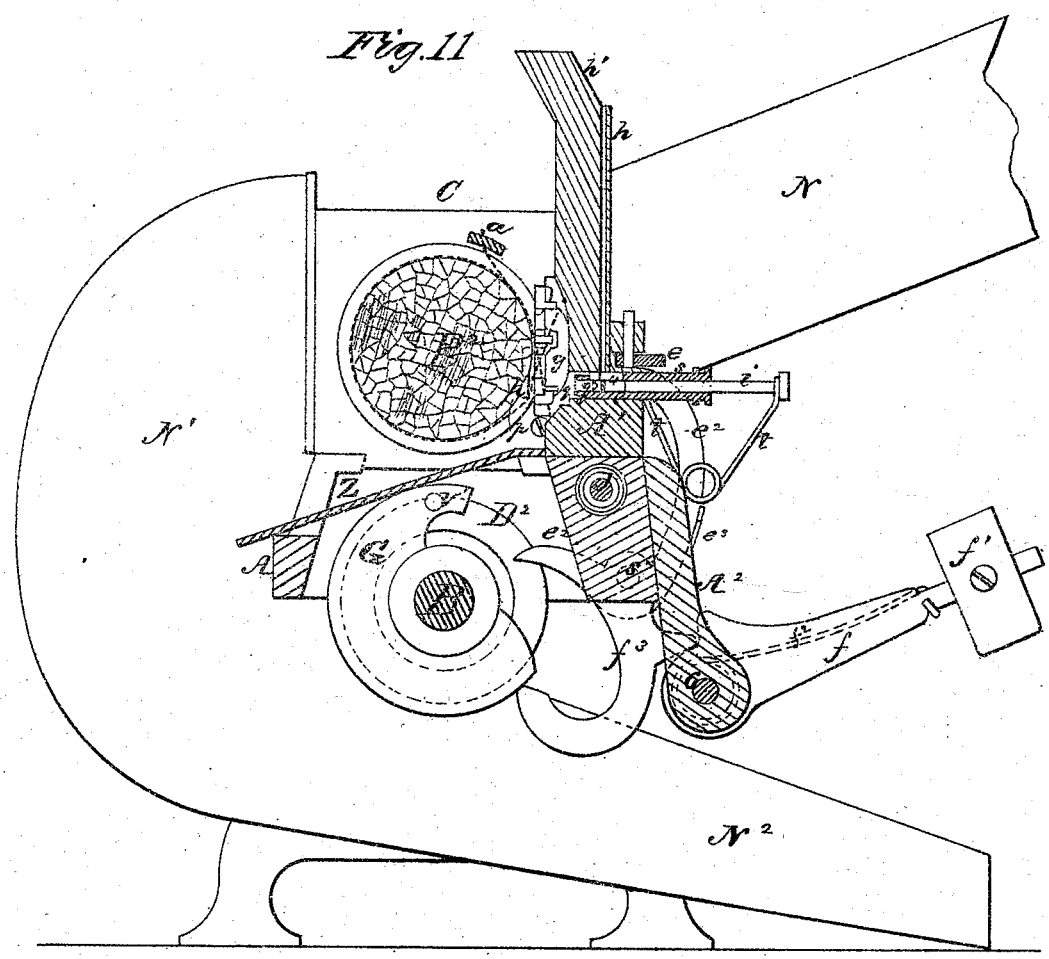
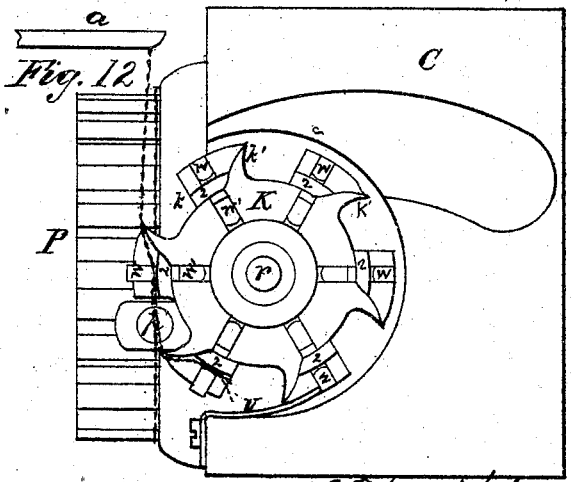
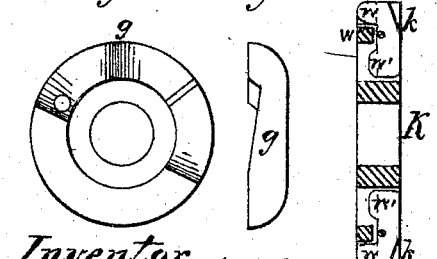
Witnesses: R. Campbell, J. N. Campbell.
Inventor. Henry A. House by his attys Mason Fenwick Lawrence

UNITED STATES PATENT OFFICE.

HENRY A. HOUSE, OF BRIDGEPORT, CONNECTICUT.

IMPROVEMENT IN MACHINES FOR BUNDLING KINDLING-WOOD AND OTHER SUBSTANCES.

Specification forming part of Letters Patent No. 138,027, dated April 22, 1873; application filed December 6, 1872.

CASE C.

*To all whom it may concern:*

Be it known that I, HENRY A. HOUSE, of Bridgeport, in the county of Fairfield and State of Connecticut, have invented certain Improvements in Machines for Bundling Kindling-Wood and other Substances; and I do hereby declare that the following is a full, clear, and exact description thereof, reference being had to the accompanying drawing making part of this specification, in which—

Figure 1:
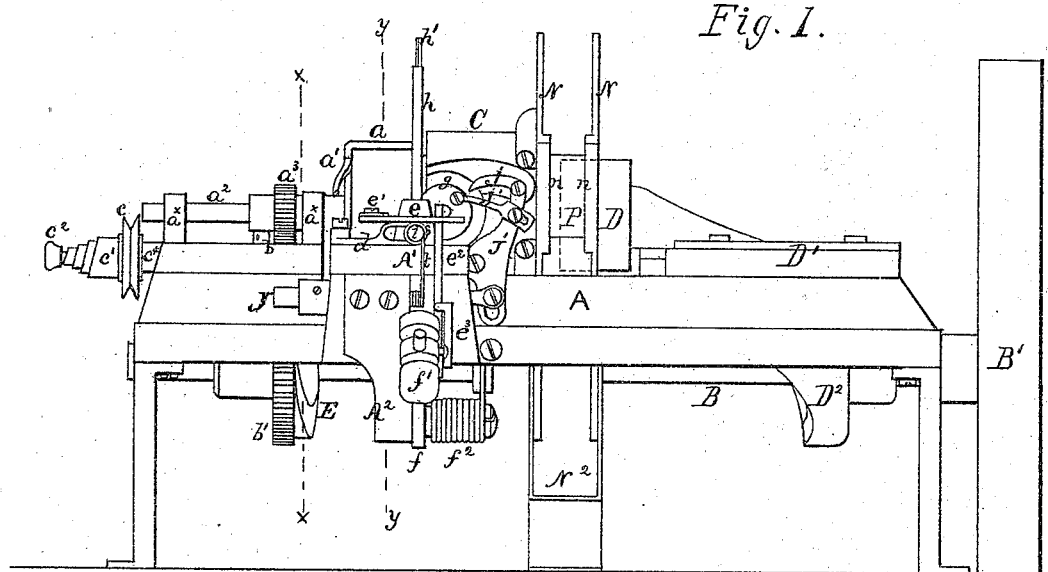
Figure 2:
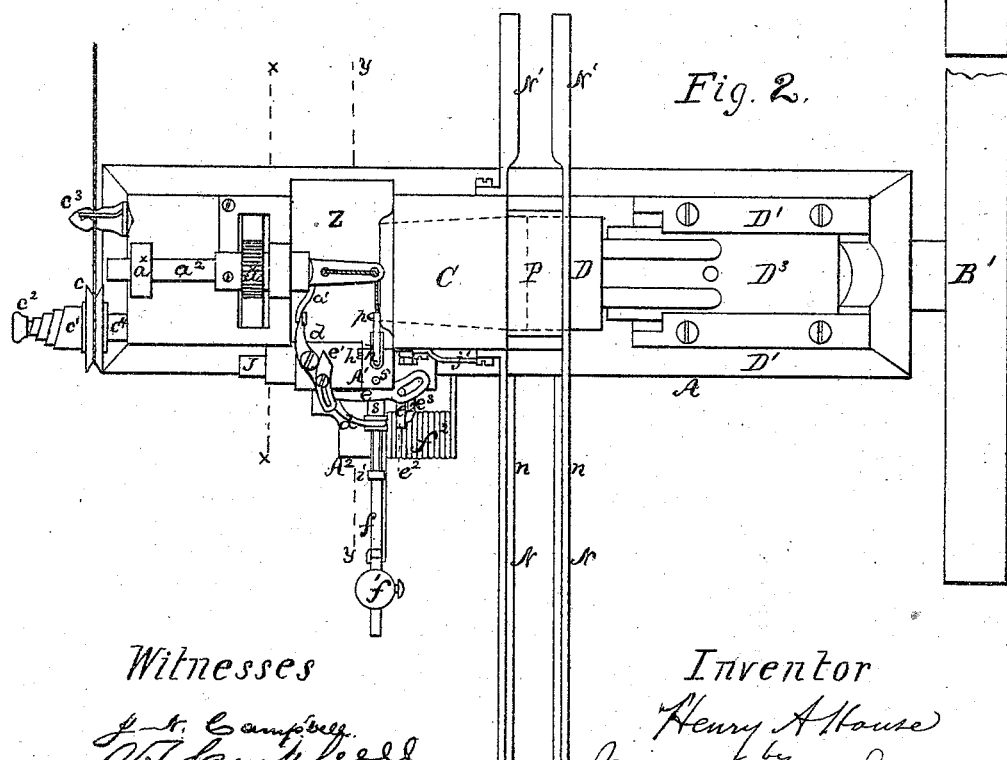
Figure 5:
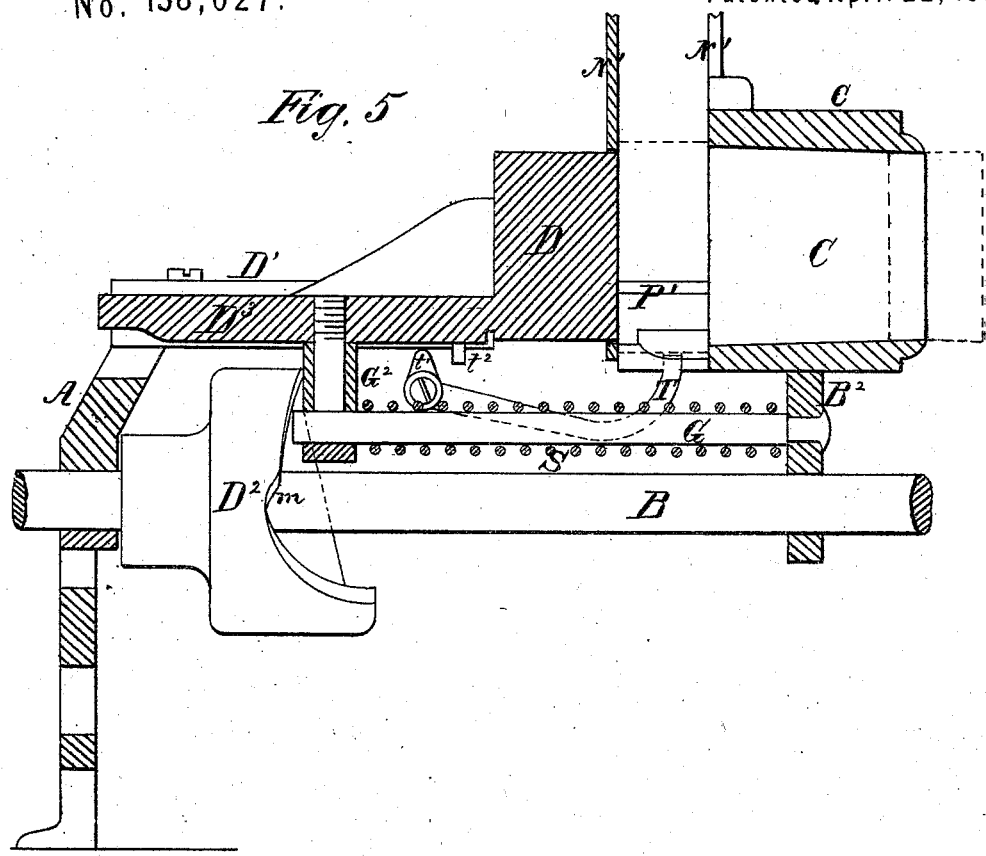
Figure 6:
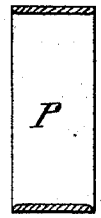
Figure 7:
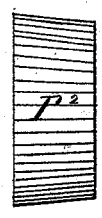
Figure 8:
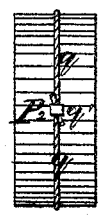
Figure 9:
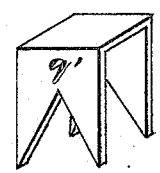
Figure 10:
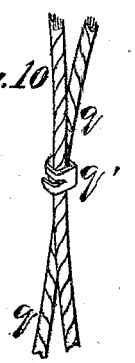

Figure 1, Plate 1, is an elevation of one side of the machine with the griping-jaws for the cord removed. Fig. 2, Plate 1, is a top view of the machine complete. Fig. 3, Plate 2, is a section taken longitudinally and vertically through that part of the machine in which the pressing and binding are performed. Fig. 4, Plate 2, is a section taken vertically and transversely through the machine in the plane indicated by dotted line $x\ x$, Figs. 1 and 2. Fig. 5, Plate 3, is a section taken vertically (except the cam $D^2$) and longitudinally through that part of the machine in which the material is compressed into the hollow tapering box. Figs. 6, 7, and 8, Plate 3, represent the successive stages through which the material passes. Fig. 9, Plate 3, shows a fastening-staple. Fig. 10, Plate 3, represents the staple when it is clinched about the ends of a band. Fig. 11, Plate 4, is a section taken vertically and transversely through the machine in the plane indicated by the dotted line $y\ y$, Figs. 1, 2, and 3. Fig. 12, Plate 4, is a view in detail, representing one side of the pressing-box with a bundle of compressed material exposed beyond one end of the same, and showing the series of jaws for holding the cord, with the cam-shaped cap removed to expose the tails of said jaws. Figs. 13 and 14, Plate 4, show the circular cam for actuating the jaws, which are shown in Fig. 12, for griping the cord. Fig. 15, Plate 4, shows in diametrical section two of the griping-jaws and their bearing-plate.

Similar letters of reference indicate corresponding parts in the several figures.

This invention relates to certain novel improvements in applying bands around bundles of kindling-wood and other substances, after the wood or other substance has been assorted and compressed, either by the means set forth in my application for Letters Patent marked "Case B," and bearing even date with the filing of this, or by any other suitable means.

Before describing my improvements in binding or banding the bundles, I desire to state that I do not lay claim under this application to any of the devices which I have claimed under the said application marked "Case B," nor do I claim anything which I have claimed in my applications for Letters Patent marked Case A', filed November 29, 1872.

The following description of my invention will enable others skilled in the art to understand it.

In the accompanying drawing, A represents a frame which will answer as a support for the banding devices. B represents a main driving-shaft, which is supported at its extremities by the ends of the frame A, and on which may be applied a driving-wheel, B', a cam-wheel, E, and if the plunger is used a cam, $D^2$, may also be applied on it. C represents a compressing-chamber of taper form internally, into which the material to be banded may be forced by the plunger D, or otherwise introduced to the banding mechanism. The binding-cord is carried from a reel beneath a tension-jack, $c^3$, Fig. 2; thence passed around a grooved tension-wheel, $c$, which turns on a stud, $c^4$, and is held with frictional contact against a shoulder of the stud by a coiled spring, $c^1$, which is adjusted by a nut, $c^2$. After passing around the wheel $c$ the cord is carried through a hollow shaft, $a^2$, the axis of which coincides with the axis of the compressing-chamber C, as clearly shown in Fig. 3. On the end of shaft $a^2$, next the chamber C, is a cranked flier, $a$, through which the cord is also passed, and by the revolution of which the cord is carried around the bundles as they are successively exposed beyond the end of the compressing-chamber C, as indicated in Fig. 11, Plate 4. The hollow shaft $a^2$ is supported by bearings $a^\times\ a^\times$ on top of frame A, and on this shaft a pinion spur-wheel, $a^3$, is keyed, the hub of which is shouldered and pressed against by a check-spring, $o$, that prevents the said shaft from turning backward when the wheel E becomes disengaged from the wheel $b$ during the operation of fastening the ends of the band upon a bundle. The pinion $a^3$ engages with another pinion, $b$, and this latter engages at times with teeth $b'$ on the periphery of the circular face-cam E. There are just a sufficient number of teeth $b'$ to give the flier-arm $a$ one revolution during a revolution of the shaft B, and after every revolution of this flier-arm $a$ it remains at rest until the ends of the cord are fastened around a bundle, and another bundle has been brought into position for binding. In connection with the flier-arm $a$ I employ a series of griping-jaws for alternately holding and releasing the cord. These jaws $w$ are shown by Figs. 12 and 15, where it will be seen that they are arranged at equal distances from each other around a circular wheel, K, which wheel and a cam-faced plate, $g$, are placed on a stud, $r$, projecting from one side of the compressing-chamber C. The stud $r$ is so arranged that as the jaws are successively moved in position for holding the cord around a bundle they will be in line with such cord as it leaves the flier-arm $a$. The pivoted jaws $w$ all radiate from the axis $r$, and each one of these jaws is received between lugs $k$ $k'$, its inner end or tail $w'$ being swelled, as shown in Fig. 15. Between the tail and griping portion of each jaw $w$ is a lug, 2, which is formed on wheel K, and against which the cord is held. The lug $k'$ of each jaw is beveled and tapered so that it will guide and direct the cord between the jaw and its lug 2. Above and a little to one side of the griping-plate $k$ is a pawl, $j$, which is pivoted to a lever, $J^1$, and which acts against the lugs $k'$ and moves the jaws into position for operation, in which position the wheel K will be held by a check-spring, $v$, beneath this plate, as shown in Fig. 12. The lever $J^1$ is connected, by its lower end, to a rod, J, which passes horizontally through an offset of frame A, and has an anti-friction stud, $J^2$, fixed to it, and a spring coiled around it. The spring just referred to holds the anti-friction stud $J^2$ against the cam-face of wheel E, the cam on which gives the required movements to the pawl $j$ at the proper times. The circular cam-plate $g$ is allowed to oscillate on the stud $r$, which movements it receives from the lever $J^1$, by means of a slotted connecting-link, $j'$. That face of the cam-plate $g$ which is next the wheel K has depressions and elevations on it for the purpose of actuating the jaws to gripe and release the cord. It is necessary that the cord should be firmly held both above and below the anvil $p$ while applying the staple-fastening to it and severing it; and this is done by the jaws on the intermittent rotating wheel K, which jaws are closed on the cord, after they are successively brought into position to receive it, by the cam-plate $g$, which latter receives an oscillating motion on the stud $r$ and releases the jaws at the proper time. After the cord is carried around a bundle, and while its ends are crossed and held opposite the concave surface of the anvil $p$, which is fixed on the end of a compressing-chamber, or on a part of a frame when such chamber is not used, these crossed ends are fastened firmly together by means of a staple, $q'$, the forked ends of which are clinched about them, as shown in Fig. 10, Plate 3, by the following means: $A^1$ represents a block which is rigidly secured upon the offset of frame A, and from which rises vertically a staple guide and feeder, $h$. The upper end $h'$ presents an obtuse angle for facilitating the filling of the guide. This guide will be better understood by stating that the passage through it corresponds in cross-section to the rectangular shape of the staple $q'$, the pointed ends of which are all directed toward the anvil $p$. This guide is kept full of the staples, which descend, one at a time, by their own gravity into a carrier-tube, $s$, which works through the block $A^1$ in line with the anvil $p$, and at right angles to the axis of the compressing-chamber C, as clearly shown in Fig. 11, Plate 4. This carrier-tube has a square opening axially through it, and an oblong slot leading into it from the lower end of the feeding-guide $h$, so that when the carrier is in the position indicated in Fig. 11 a staple, $q'$, can drop into it. Inside of the carrier-tube $s$ is a clinching-tool, $i$, which is thrown back to the position indicated in Fig. 11 by a spring, $t$.

The carrier-tube $s$ is moved up to the anvil $p$ by means of a forked lever, $d$, the forked end of which embraces the carrier between two collars formed on it, and the opposite end of which is acted on by a cam-shaped tail, $a^1$, on the flier-arm $a$, as this arm winds the cord upon a bundle. The carrier-tube $s$ is moved away from the anvil to the position indicated in Fig. 11 by the same spring $t$ which withdraws the clinching-tool. A groove in the clinching-tool and a pin which enters therein from the carrier will prevent the complete extraction of the clinching-tool from the latter.

When the carrier is brought up to the anvil $p$, and held there by the cam-tail $a^1$, the clinching-tool being held in the position shown in Fig. 11, the latter is struck by a hammer, $f^1$, which is adjustably applied on the outer end of an arm, $f$, when it will forcibly drive a staple, $q'$, forward against the anvil $p$, and clinch its ends about the crossed cords. The hammer-arm $f$ is pivoted to a bracket, $A^2$, at 6, and acted on by a spring, $f^2$, which gives the stroke when the hammer-arm is released.

On the main shaft B a tripping plate or cam, G, is keyed, as shown in Fig. 11, Plate 4, to which a pin or stud, $v'$, is secured. This plate G performs two offices, to wit: It throws down the hammer $f^1$ to the position shown in Fig. 11 by acting directly on a hooked lever, $f^3$, which, in turn, reacts against a shoulder near the pivot 6 of said hammer, and then it holds the hammer in said position until the carrier-tube $s$ is brought up against the anvil $p$, when it suddenly releases the lever $f^3$ and hammer-arm $f$, and allows the spring $f^2$ to give the clinching stroke. The pin or stud $v'$ on the plate G actuates a curved lever, $e^2$, which is pivoted at 8, and whose upper end enters a slot in the right-hand end of a lever, $e$. This lever $e$ carries on one end a knife, $e^1$, adjustably connected to it, which is designed for cutting the cord after each staple has been clinched, and thus allowing the bundle, when it is forced out of the compressing-chamber C by the plunger D, to escape from the machine. This operation takes place immediately after a staple is clinched on a band. After the pin or stud $v'$ releases the lever $e^2$, it is caused to return the knife $e^1$ to the position shown in Fig. 2 by a spring, $e^3$, which spring is attached below the offset of frame A.

Having described my invention, what I claim as new, and desire to secure by Letters Patent, is—

1. The intermittent flier-arm $a$, for carrying a cord or band and applying the same around bundles of kindling-wood or other substance, in combination with the clinching mechanism, substantially as described.

2. The tubular shaft $a^2$, carrying the flier-arm $a$ and receiving through it the binding material, and acted on by a check-spring, $o$, in combination with the clinching mechanism, substantially as described.

3. The combination of the tension device, flier-arm $a$, and the clinching mechanism, substantially as described.

4. The cam-plate E on shaft B, having teeth $b'$ on its periphery, for giving intermittent motion to the shaft $a^2$ of the flier-arm $a$, substantially as described.

5. The cam-tail $a^1$ on the flier-arm $a$, in combination with a lever, $d$, for actuating the staple-carrier $s$, substantially as described.

6. The slotted sliding staple-carrier $s$, receiving through it the clinching-tool $i$, and operating substantially as described.

7. The combination of the anvil $p$, staple-carrier $s$, and clinching-tool $i$, substantially as described.

8. The staple-feeder $h$, combined with and arranged over a sliding staple-carrier, $s$, which has a clinching-tool moving through it, substantially as described.

9. The hammer $f^1$ on arm $f$, actuated by a spring, $f^2$, tripping-lever $f^3$, and tripping-cam G, in combination with the clinching-tool $i$, substantially as described.

10. The cutter $e^1$ applied to the lever $e$, and operating substantially as described.

11. The intermittently-rotating plate $k$, carrying-jaws $w$ and lugs 2 on its periphery, for griping the binding-cord from the flier-arm $a$, substantially as described.

12. The beveled guides $k'$, in combination with the jaw $w$, substantially as and for the purposes described.

13. The cam-plate $g$, in combination with the griping-jaws $w$, for the purpose of causing these jaws to gripe and release the binding-cord at the proper times, substantially as described.

14. The lever $J^1$, actuated by the cam-plate E, and carrying the pawl $j$ and the connecting-rod $j'$, substantially in the manner and for the purposes described.

HENRY A. HOUSE.

Witnesses:
J. N. CAMPBELL,
JAMES MARTIN, Jr.